INVENTOR:
ARVID E. ENGLUND, JR.
BY I. David Blumenfeld
HIS ATTORNEY.

INVENTOR:
ARVID E. ENGLUND, JR.
BY David Blumenfeld
HIS ATTORNEY.

3,453,395

SOLID-STATE HYBRID

Arvid E. Englund, Jr., Lynchburg, Va., assignor to General Electric Company, a corporation of New York Filed Dec. 1, 1965, Ser. No. 510,922

Int. Cl. H04m *1/21*

U.S. Cl. 179—81 7 Claims

ABSTRACT OF THE DISCLOSURE

A solid-state hybrid having a high degree of isolation between the send and receive line of a four-wire set is achieved without the use of balancing networks, etc. The local two-wire send line is coupled through a transistor circuit to the two-wire transmission line, and is also coupled to a transistor-amplifier in the receive line. A pair of emitter-followers are coupled between the send line and the receive amplifier to produce two equal, in-phase signals which are impressed on the base and emitter electrodes of the amplifier. As a result, the voltage variations across the base-emitter junction of the receive amplifier due to the local signal from the send line are equal to zero, thereby isolating the send and the receive lines.

This invention relates to a communication hybrid circuit and, more particularly, to a solid-state wideband hybrid having reduced insertion loss, and enhanced signal isolation characteristics.

In telephony, or other types of communication media, it is not unusual to use both simplex and duplex lines or channels in different portions of the system. Some form of line terminating equipment must, therefore, be provided since it is necessary to interconnect the four-wire send/receive simplex lines (or simplex send/receive channels) and the two-wire duplex line (or channel) at some interface within the system. Such terminating equipment usually includes hybrid arrangements which, in the prior art devices, have been bridge circuits, either of the resistive or transformer type, which combine the functions of providing impedance matching between certain of the circuits or lines and signal isolation between other circuits or lines. In a four-wire terminating set, the hybrid is thus used to connect a four-wire line to a two-wire line, so that both directions of transmission, i.e., send and receive, on the four-wire simplex lines are isolated from each other, but are connected to the two-wire duplex line.

A simple resistive or transformer hybrid has four sets of terminals, one set connected to the two-wire line, two sets connected respectively to the send and receive lines of the four-wire line (which may, in turn, be connected to one or more channels of a frequency-division multiplex carrier system, for example) and the remaining set connected to a matching network. This network is adjusted or designed to simulate the impedance of the two-wire line and maintain the desired impedance match between lines and thereby enhance signal isolation between the send and receive lines or channels. The extent to which this impedance is simulated is known as the "hybrid balance." Alternately, "hybrid balance" can also be defined in terms of "return-loss characteristics," i.e., the signal loss between the send and receive lines of the hybrid. If the impedances of all the line elements, including the receive, send, and two-wire lines, are perfectly matched, i.e., the hybrid is perfectly balanced, the hybrid return-loss is infinite and there is no signal transmission between the send and receive lines, which means there is perfect signal isolation. However, in physically-realizable hybrids, the return loss is finite because of the practical impossibility of perfectly balancing the impedances of all of the lines over the entire operating frequency range, and the return loss is usually expressed in terms of decibel (db) loss or suppression of the unwanted signal. Thus, for example, a 40–50 db return-loss is considered adequate isolation for many communications and telephony purposes.

With prior-art hybrids of the transformer or resistive type, it is extremely difficult to obtain 40 or more db of isolation in a hybrid at reasonable cost. In transformer hybrids, the winding of the various hybrid coil sections is extremely difficult, delicate, and expensive if the necessary balance of the device and the required degree of isolation between the send and receive lines is to be achieved. Furthermore, transformer hybrids are obviously bandwidth-limited, since the capacitance between the individual winding turns makes the device frequency-sensitive. In addition, prior art transformer and resistive hybrids also involve a certain amount of signal loss within the hybrid itself, a loss which is customarily designated as the insertion loss. In these prior-art hybrids, the insertion loss in the hybrid was anywhere from 3 to 10 db. This signal loss within the hybrid (and particularly with resistive hybrids), of course, represents an undesirable characteristic and an additional cost since additional equipment and increased amplification has to be provided somewhere in order to compensate for the losses introduced in the hybrid.

It is, therefore, a primary objective of this invention to provide a solid-state hybrid which is capable of providing enhanced signal isolation simply, effectively, and at minimum cost.

Another objective of this invention is to provide a wideband solid-state hybrid, capable of providing substantial signal isolation between communication lines or channels.

A still further objective of this invention is to provide a solid-state hybrid circuit which eliminates or minimizes hybrid signal insertion loss and which is, in fact, capable of providing gain.

Yet another objective of this invention is to provide a transistorized hybrid configuration which does not have the inherent bandwidth limitations of prior-art transformer type of hybrids.

Other objectives and advantages of the instant invention will become apparent as the description thereof proceeds.

These advantages and objectives are realized in one form of the invention by providing a solid-state hybrid in which the local send line (local audio) is coupled through a solid-state circuit to the two-wire line (remote audio) which, in turn, is coupled to the input of a solid-state signal translating device (such as a transistor amplifier, for example) the output of which is coupled to the receive line. In order to prevent translation of the local audio signal and its application to the receive line, a further solid-state circuit is coupled between the send line and the translating device to balance out or neutralize the local audio signal applied over the two-wire line. These two solid-state circuits are coupled to the translating device in such a manner that two equal, in-phase local audio signal components are applied to the input and common electrodes of the transistor amplifier translating device so that the local audio voltage variations across the forward-biased transistor junction are equal to zero. There is, therefore, no translation or amplification of the local audio and only the remote amplified audio from the two-wire line is recovered at the receive line. The local four-wire receive line is thus effectively isolated from the local send line without the use of expensive, difficult-to-wind, bandwidth-limited transformers, while at the same time minimizing or eliminating the signal insertion loss produced by the hybrid.

The various features of the invention, which are believed to be new and novel, are set forth with particularity in the appended claims. The invention, itself, however, may best be understood by reference to the following description, when taken in conjunction with the accompanying drawings, in which:

Figure 1:
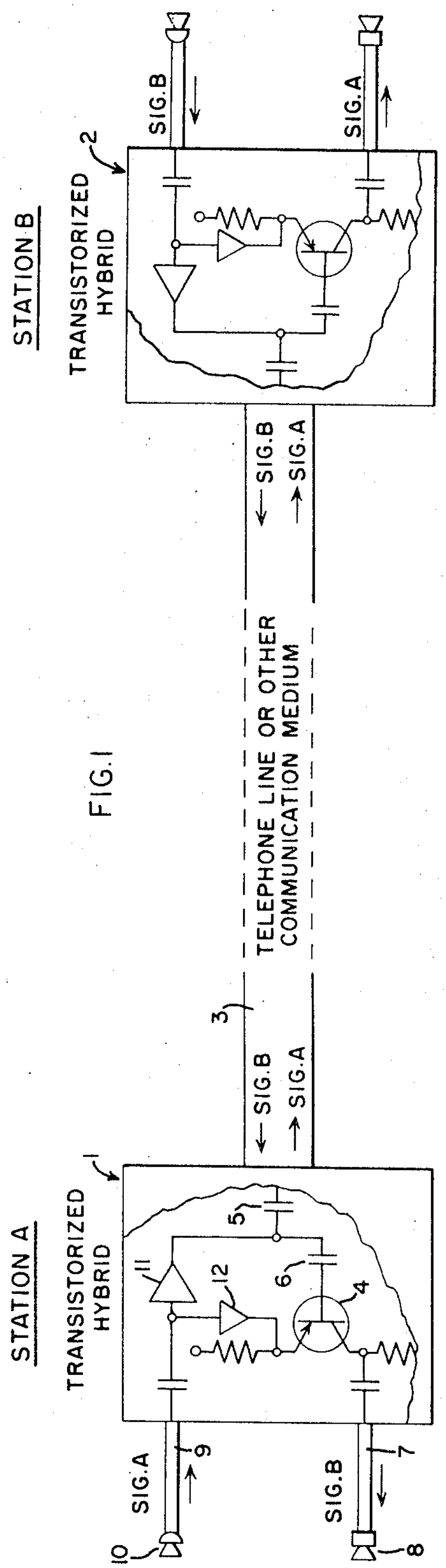
FIGURE 1 is a block diagram of a communication system incorporating the novel transistorized hybrid.

FIGURE 1 illustrates, in greatly-simplified block diagram form, the novel hybrid in the environment of a communication system for establishing telephone or other communication between two remotely-located stations, A and B. Each of these locations includes line-terminating equipment 1 and 2 for interconnecting local four-wire simplex send and receive lines and a duplex two-wire communication line or channel. Each terminating set includes a transistorized hybrid, which provides isolation between locally-generated audio signals impressed on the four-wire send line, and the local receive line. The transistorized hybrid thus permits extraction of a remote audio signal received from the two-wire duplex line, while at the same time coupling a locally-generated audio signal from the four-wire send line to the duplex two-wire line 3.

The transistorized hybrid, as illustrated very generally at 1 in station A, includes, inner alia, a solid-state signal translating stage 4, (such as transistor-amplifier stage, for example) which has the remote audio signal B from station B, applied to its base or input electrode through coupling capacitors 5 and 6. Also applied to the base of transistor (the collector of which is connected to four-wire receiver line 7 which may be terminated in a loudspeaker 8 or other utilization device) is the local audio signal from four-wire send line 9, which includes a signal-generating device, such as a microphone 10. This local audio from send line 9 is coupled through a pair of emitter-followers, shown generally at 11 and 12, to the base (input electrode) and emitter (common electrode) of transistor amplifier 4. Thus, equal in-phase local audio signals are applied, both to the base and emitter of transistor-amplifier 4, and the voltages at these electrodes vary instantaneously in the same phase and by the same amount. The local audio voltage variations across the forward-biased base-emitter junction are, therefore, zero; and there is no local audio input to the transistor. Hence, none of the local audio appears at the collector of transistor amplifier 4, and at the receive line 7, thus isolating the local four-wire send line from the four-wire receive line. The local audio from send line 9 is, however, coupled through emitter-follower 11 and coupling capacitor 5 to two-wire line 3 for transmission to station B. It will be seen, therefore, that by virtue of this combination of transistor amplifier, emitter-follower, etc., complete isolation of the local four-wire send and receive lines is effected while permitting transmission of the local audio signal over the two-wire line.

Figure 2:
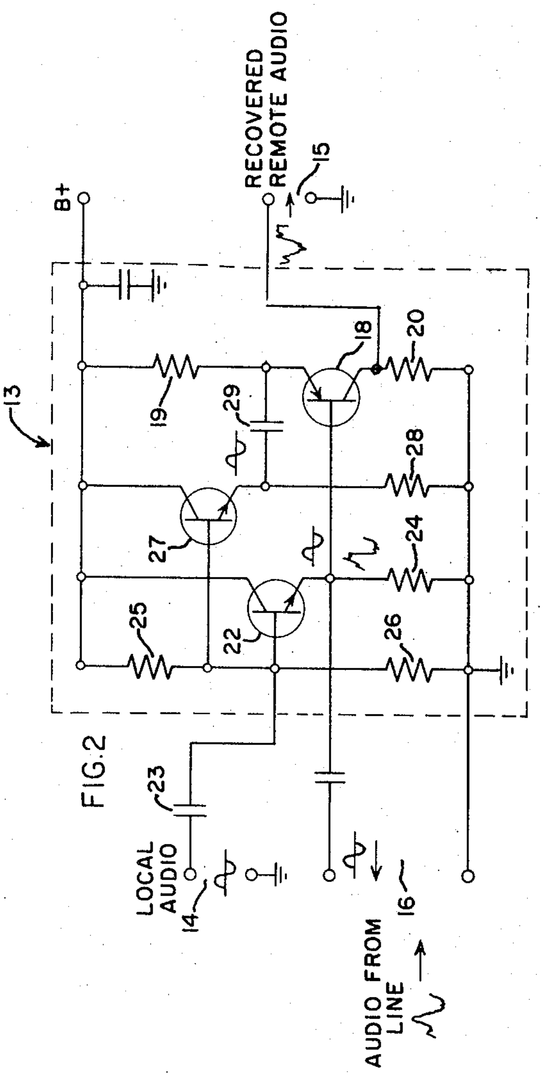
FIGURES 2–4 are circuit diagrams of a number of transistorized hybrids useful for balanced and unbalanced operation.

FIGURE 2 is a circuit diagram of the transistorized hybrid arrangement, constructed in accordance with the invention, for interconnecting an unbalanced two-wire duplex line with a four-wire line. The transistorized hybrid, shown generally within the dashed rectangle 13, interconnects a local four-wire send line shown generally at 14, and a local four-wire receive line shown generally at 15, with an unbalanced two-wire duplex line 16. Local send line 14 receives local audio signals (shown as a pure sine wave for ease of illustration and clarity) at its input terminals from a microphone of a local handset, not shown, or any other source, and couples these signals through the hybrid to the unbalanced two-wire line, which is connected to a telephone trunk or other communication medium. Four-wire receive line 15 is also coupled to the hybrid and may, in turn, be coupled to a reproducer or utilization circuit, not shown, for recovered remote audio. Hybrid 13, of course, must isolate the local audio impressed on send line 14 from the local receive line 15 to the extent of providing at least 40–50 db attenuation of the local audio signal, while, at the same time, permitting extraction or recovery of the remote audio shown as a time-varying complex wave to distinguish it from the local audio.

Two-wire line 16 is coupled to the base of a signal-translating stage, such as PNP transistor-amplifier 18 through capacitor 17. Transistor 18 is connected in the common emitter configuration and also inclues an emitter connected through resistor 19 to positive terminal B+ of the D.C. voltage supply, and a collector connected through resistor 20 to a common or grounded bus. The amplified remote audio signal at the collector of amplifier 18 is coupled through capacitor 21 to receive line 15.

The locally-generated audio signal is applied to the two-wire line through a transistor stage 22, connected in the common collector or "emitter-follower" configuration. Emitter-follower 22 includes an NPN transistor having a base connected to the input terminal of send line 14 through capacitor 23, a collector connected directly to the B+ supply terminal, and an emitter connected through resistor 24 across the two-wire line. The base of the transistor is also connected to the junction of the voltage divider resistors 25 and 26, which are connected in series between the B+ terminal and ground to establish the quiescent DC-biasing conditions for the transistor. The local audio signal, which is impressed on the base of emitter-follower 22, appears as an in-phase signal across the emitter-resistor, and is thus impressed across two-wire line 16 for transmission to the remote station. The local audio signal which is impressed across two-wire line 16 is, of necessity, also connected to the base of transistor amplifier 18, since two-wire line 16 is connected to amplifier 18 to recover and amplify the remote audio.

In order to prevent amplification of the local audio signal by transistor amplifier 18, and to isolate local receive line 15 from the send line, the local audio signal input to amplifier 18 must be cancelled or neutralized. To this end, a second emitter-follower 27 is coupled between send line 14 and the emitter of amplifier 18. Emitter follower 27 has its base connected through coupling capacitor 23 to send line 14, so that the same local audio signal applied to emitter-follower 22 is also applied to emitter-follower 27. The collector of NPN emitter-follower transistor 27 is, in the customary manner, connected directly to the B+ voltage supply terminal, and the emitter is connected through resistor 28 to the grounded bus. The output signal across emitter-resistor 28 is coupled through capacitor 29 to the emitter of transistor amplifier 18. The output signal from emitter-follower 27 is in phase with the output signal from emitter-follower 22 and of the same or very nearly the same amplitude, since emitter-followers do not provide any voltage gain. Thus, the local audio signal is coupled both to the base (or input electrode) and to the emitter (or common electrode) of amplifier 18. Local audio voltages at both the base and emitter, therefore, vary instantaneously in the same direction and by the same amount, so that the local audio input to transistor 18 is effectively zero. That is, the voltage variation across the base-emitter junction of the transistors, produced by the local audio signal is zero. For example, if a change in applied audio causes the emitter to go more positive by one volt, the base is at the same time also caused to go more positive by one volt, so that the net voltage change across the base-emitter junction is zero. This is the equivalent of neutralizing or cancelling the local audio signal at least to the extent that the instantaneous amplitude variations of the audio signals applied to the base and the emitter are exactly equal. Receive channel 15 is thus effectively isolated from send line 14, since no local audio signal will appear at the output of amplifier 18. Even if the amplitudes of the local audio signals applied to the base and emitter are not exactly equal, the difference between the amplitudes can be made sufficiently small to provide an effective suppression of the signal by 40 to 50 db from the level of the recovered remote audio, which is sufficient isolation for most telephone and normal communication purposes.

It will be apparent to those skilled in the art that the trans-hybrid "return-loss" and, hence, the degree of isolation afforded by the transistorized hybrid, is achieved by applying to the input and common electrodes of the receive line amplifier or signal translation device, two in-phase local audio components which are equal in magnitude, or as close in magnitude as possible. It will also be further apparent that the circuit arrangement for providing the two equal, in-phase signal components within the hybrid is not necessarily limited to the use of two emitter-followers, since it is apparent that other transistor circuit configurations may be used to produce the equal, in-phase signals, including configurations capable of producing voltage gain. However, emitter-followers are preferred as their use eliminates or substantially minimizes the need for selecting transistors having matching gain characteristics; a parameter which is critical if voltage-amplifying stages are used. Thus, the use of emitter-followers greatly simplifies the problem of producing two in-phase signals which have substantially equal amplitudes, in order to produce maximum isolation. This, of course, simplifies the manufacture of devices of this sort and also substantially reduces the cost of the transistor components incorporated therein.

Figures 3, 4:
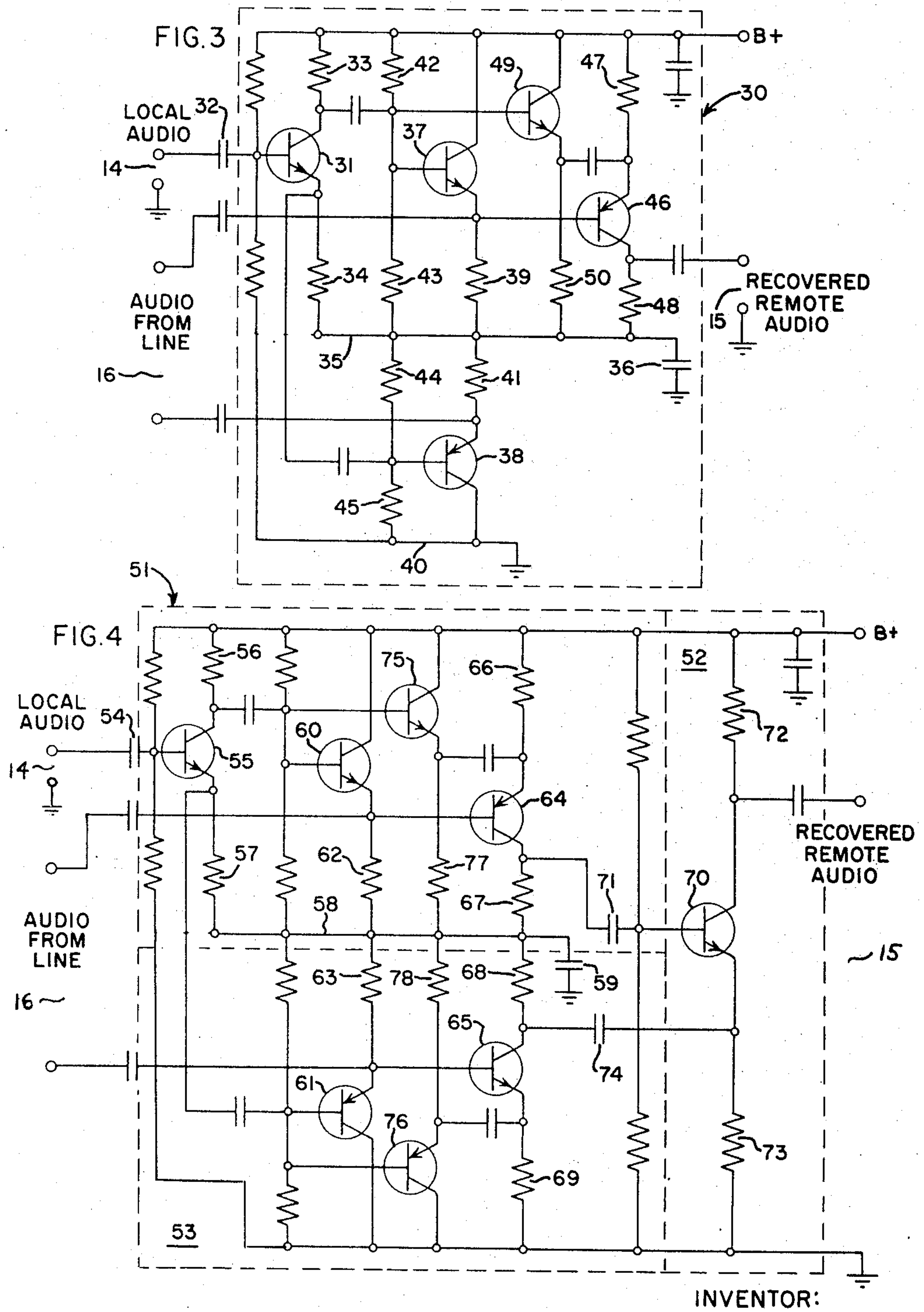

The transistorized hybrid illustrated in FIGURE 1 is one designed for use with a two-wire line which is unbalanced with respect to ground. In many circumstances, of course, the hybrid must be utilized with a balanced two-wire line, which, in turn, requires that provision be made for producing two complementary out-of-phase local audio signal components for transmission over the two-wire line. FIGURE 3 illustrates an alternate transistorized hybrid construction for use with a balanced two-wire line in which two complementary out-of-phase local audio signal components are derived from the send line audio signal for transmission over the balanced two-wire line. The hybrid shown within the dashed rectangle 30 again interconnects a duplex two-wire line 16 and four-wire send and receive lines 14 and 15. The two-wire audio line is, however, balanced with respect to ground so that remote audio signals at the upper and lower terminals of the line are 180° out of phase. By the same token, the local audio signals to be transmitted to the remote location must be in the form of two out-of-phase components. To this end, the local audio signal at the input terminals of send line 14 is first applied to a phase-splitter 31. Phase-splitter 31 includes an NPN transistor having a base connected to the send line through coupling capacitor 32, a collector connected through resistor 33 to the B+ supply voltage terminal, and an emitter connected through resistor 34 to a grounded bus 40. Two equal, out-of-phase audio signal components are taken from the collector and emitter of phase-splitter 31, with the signal at the emitter being in phase with the input audio from the send line, and the signal at the collector being 180° out-of-phase with the input audio.

These two signal components are respectively applied to a pair of complementary emitter-follower circuits 37 and 38, which are connected to opposite sides of balanced two-wire line 16. Emitter-follower 37 includes an NPN transistor having a base connected to the collector of phase-splitter 31, a collector connected directly to the B+ supply voltage terminal, and an emitter connected through resistor 39 between the upper side of two-wire line 16 and a common bus 35, which is grounded for A.C. through by-pass capacitor 36. The local audio signal component applied to emitter-follower 37 appears across emitter-resistor 39 for transmission over two-wire line 16. The other local audio signal component from phase-splitter 31 is applied to the base of an NPN transistor connected as emitter-follower 38. This transistor has a collector connected directly to a point of reference or ground potential 40, and an emitter connected through resistor 41 between common bus 35 and the lower side of line 16. It is obvious that, by virtue of the additional emitter-follower stage 38 and phase-splitter 31, the local audio signal is applied to the two-wire line as two equal, out-of-phase signal components for proper transmission over a balanced two-wire line.

Common bus 35, though grounded for AC by capacitor 36, is at a DC potential which is positive with respect to ground, but is less positive than the voltage at the B+ terminal. This DC voltage level at the common bus is established by a voltage divider arrangement (connected between the B+ terminal and bus 40) consisting of series connected resistors 42–45 to establish the quiescent biasing conditions for emitter-followers 37 and 38.

Isolation of receive line 15 and send line 14 is achieved in a manner similar to that illustrated in FIGURE 2. Thus, the local audio output signal component which is applied to the upper side of line 16 is also impressed on the base or input electrode of a PNP transistor amplifier stage 46, connected in the common emitter configuration. Transistor 46 includes an emitter connected to the B+ voltage supply terminal through resistor 47 and a collector connected through resistor 48 to common bus 35. As described previously, a second emitter-follower 49 is provided to supply an additional local audio signal to the amplifier to neutralize the effects of the local audio applied to the base. The base of emitter-follower 49 is connected to the collector of phase-splitter 31 and, thus, has the same signal impressed thereon as emitter-follower 37. The collector of emitter-follower 47 is connected directly to the B+ supply voltage terminal and the emitter is connected through resistor 50 to grounded bus 35. The emitter is also coupled through capacitor 51 to the emitter of amplifier stage 46. As explained previously, equal, in-phase local audio signals are applied to the emitter and base of amplifier 46, so that the voltage variation across the base-emitter junction due to the local audio signal is substantially zero. The local audio signal, therefore, does not appear across collector-resistor 48, and is not impressed on receive line 15, thus isolating the local send and receive lines.

The remote audio from two-wire line 16 is amplified in amplifier 46 and applied to the receive line for use in a reproducing mechanism or other utilization device. Thus, the upper side of the two-wire line is coupled to the base or input electrode of transistor-amplifier 48 and the signal component appearing between the upper side of line 16 and the common bus is amplified and applied to the receive line 15.

The transistorized hybrid circuit of FIGURE 3 is so arranged that the local audio signal from the send line is translated and applied to the two-wire line as two complementary out-of-phase components for use with a balanced two-wire line. It will be recognized, however, that the out-of-phase remote audio signal components are only partially utilized inasmuch as only the signal component appearing between the upper side of the line and ground is applied to amplifier 48. The out-of-phase complementary component appearing between the lower side of the line and ground is not applied to amplifier 48, but is simply dissipated across the emitter-resistor 41 of emitter-follower 38. It may be desirable, however, in certain instances to utilize and recover this component of the remote audio signal, even at the expense of having to provide additional circuitry. FIGURE 4 illustrates such a transistorized hybrid, which produces not only a balanced local audio signal for transmission over the two-wire line, but also permits recovery of the entire remote audio signal, while, at the same time, providing the needed isolation between local send and receive lines.

Transistorized hybrid 51 of FIGURE 4 includes two complementary sections 52 and 53, for recovering the out-of-phase remote audio signal components and also for translating local audio signals into two out-of-phase components while, at the same time, providing suitable isolation between send line 14 and receive line 15. The local audio signal from send line 14 is applied through coupling capacitor 54 to phase-splitter 55. Phase-splitter 55 includes an NPN transistor having a base connected to capacitor 54, a collector connected through resistor 56 to the B+ voltage supply terminal, and an emitter connected through resistor 57 to a grounded bus. Two equal out-of-phase signal components are taken respectively from the collector and emitter of the phase-splitter. The output signal components are applied to two complementary emitter-follower stages 60 and 61, with the signal component at the collector being applied to emitter-follower 60, and the signal component at the emitter being applied to emitter-follower 61. The two out-of-phase local audio signal components are processed in these two stages to produce a pair of out-of-phase audio signal components for transmission over the balanced two-wire line 16.

Emitter-follower 60 includes an NPN transistor having a collector connected directly to the B+ voltage supply terminal, an emitter connected through resistor 62 to common grounded bus 58, which is grounded for A.C. by a by-pass capacitor 59, and a base connected to collector of phase-splitter 55. The local audio signal from the collector of phase-splitter 55 appears, therefore, between the upper side of two-wire line 16 and the grounded common bus. Similarly, the complementary emitter-follower 61 includes a PNP transistor having a collector connected directly to ground, an emitter connected through resistor 63 to common bus 58, and a base connected to the emitter of phase-splitter 55. The input to emitter-follower 61 is, therefore 180° out of phase with the input to emitter-follower 60, so that the local signal component appearing across its emitter-resistor 63, and which is impressed between the lower side of the two-wire line 16 and grounded bus 58 is 180° out of phase with the signal component applied to the other side of the balanced line. Thus, two 180° out-of-phase local audio signal components are provided for transmission over two-wire line 16.

The received remote audio signal components from two-wire line 16 are applied to the bases or input electrodes of a pair of complementary transistor amplifiers 64 and 65, both of which are connected in the common emitter configuration. Amplifier 64 includes a PNP transistor having an emitter connected through resistor 66 to the B+ voltage supply terminal, a collector connected through resistor 67 to common bus 58, and a base connected to one side of two-wire line 16. Amplifier 65 consists of an NPN transistor having a collector connected through resistor 68 to common bus 58, which is at a positive DC potential with respect to ground, an emitter connected to ground through resistor 69, and a base connected to the other side of two-wire line 16. The out-of-phase remote audio components from the two-wire line are amplified in amplifier stages 64 and 65 respectively, to produce at their collectors two amplified out-of-phase remote audio signal components. These amplified remote audio components are, in turn, applied to a summing amplifier 70, which includes an NPN transistor having a base connected through coupling capacitor 71 to the collector of transistor amplifier 64, a collector connected through resistor 72 to the B+ voltage supply terminal, and an emitter connected through resistor 73 to ground. The amplified remote audio signal component at the output of transistor amplifier 65 is applied through a coupling capacitor 74 to the emitter of summing amplifier 70. Thus, the amplified out-of-phase remote audio components are applied respectively to the base and emitter of amplifier 70. It will be apparent that the instantaneous voltage variation across the base-emitter junction, due to the remote audio, is equal to the sum of the amplified components. For example, if at a given instant the audio voltage at the base of the amplifier increases in the positive direction by one volt, the out-of-phase voltage applied to the emitter increases in the negative direction by the same amount, one volt, so that the voltage variation across the base-emitter junction is two volts. Thus, in effect, the input signal to amplifier 70 is equal to the sum of the two amplified components from balanced line 16. The output signal at the collector of amplifier 70 is coupled to the output terminals of local receive line 15 for utilization in a sound reproducer or other end-use device. It is thus apparent that in the hybrid of FIGURE 4, both of the remote audio signal components from two-wire line 16 are recovered and transmitted over the local receive line.

The transistorized balanced hybrid of FIGURE 4 also contains additional emitter-follower stages coupled to amplifiers 64 and 65 to prevent transmission of the local audio signal components to receive line 15, thereby isolating the send and receive lines. These emitter-follower 75 and 76 have their bases coupled respectively to the collector and emitter-electrodes of phase-splitter 55, and in the manner described in connection with FIGURES 2 and 3, produce a local audio signal at their emitters which is applied, respectively, to the emitters of transistor amplifiers 64 and 65. Since the base or input electrodes of these amplifiers also have a local audio signal applied thereto, which is of the same magnitude and phase as that applied to their emitters, the local audio voltage variation across the base emitter junction of these amplifiers is equal to zero, and there is no coupling of the local audio into the receive line 15.

Emitter-followers 74 and 75 respectively include NPN and PNP transistors with their collectors connected respectively to the B+ supply voltage terminal and to ground, and their emitters connected through resistors 76 and 77 to common bus 58, which is maintained at AC ground potential. It is, therefore, obvious that these emitter-followers operate in conjunction with the associated emitter-followers 60 and 61 to provide cancellation or neutralization of the local signal at the input of the receive line to provide the desired isolation between transmit and receive lines.

In order to ascertain the degree to which the solid-state hybrid of the invention provides signal isolation between the send and receive lines over a range of frequencies extending from 100 cycles to 100 kilocycles, a hybrid of the type illustrated in FIGURE 2 was constructed with components having the following values:

| | | |
|---|---|---|
| Resistors: | | |
| **19** | ohms | 620 |
| **20** | do | 5.1K |
| **24** | do | 620 |
| **25** | do | 3.3K |
| **26** | do | 6.2K |
| **28** | do | 620 |
| Capacitors: | | |
| **23** | microfarads | 22 |
| **29** | do | 150 |
| Line coupling capacitors | do | 47 |
| Transistors: | | |
| **18** | | 2N3250 |
| **22** G.E. silicon transistor | | 16A2 |
| **27** | | 2N706 |

The test procedures was as follows: a first audio oscillator was coupled to two-wire line 16 and the output level at FIGURE 1 adjusted to −20 db (.085 v. A.C.) at the two-wire line terminals of the hybrid. A second local oscillator at *f2* was coupled to the send line and its output adjusted to produce a "local audio" signal level at −20 db at the two-wire line terminals of the hybrid. The signal level of the audio from the two-wire line (*f1*) was then measured at the receive line terminals as 0 db (.77 v. A.C.). The output from the oscillator coupled to two-wire line 16 was then reduced to zero and the remaining output at the receive terminals was measured to determine the amount of "local audio" in the receive channel in terms of —db from the desired 0 db level of the "remote audio" from two-wire line 16 over the desired frequency spectrum. The following tabulation shows these test results:

| "Local audio" frequency, c.p.s.: | db Below desired level of "remote audio" |
|---|---|
| 100 | —53.5 |
| 200 | —55 |
| 400 | —55.5 |
| 600 | —56 |
| 800 | —56 |
| 1000 | —56 |
| "local audio" frequency, kc.: | |
| 1.5 | —56 |
| 2 | —56 |
| 4 | —56 |
| 6 | —56 |
| 8 | —56 |
| 10 | —56 |
| 15 | —55.5 |
| 20 | —54.4 |
| 30 | —52.75 |
| 40 | —51.5 |
| 60 | —49 |
| 80 | —46.5 |
| 100 | —45 |

It is abundantly clear that the transistorized hybrid provides between 40–60 db suppression of the unwanted signal over a frequency range of 100 kc. and provides better than 50 db suppression over the voice frequency range. Thus, not only does it provide excellent isolation, but provides it over a wide frequency spectrum including the voice frequency band.

While a particular embodiment of the invention has been described and shown, it will be understood that it is not limited thereto, since many modifications and variations in the method and the circuit arrangement for carrying out the invention may be made. It is contemplated that the appended claims cover any such modifications as fall within the true spirit and scope of this invention.

What is claimed and desired to be secured by Letters Patent of the United States is:

1. In a solid-state hybrid for interconnecting a two-wire line with four-wire send/receive lines the combination comprising, (a) individual terminal pairs adapted to be coupled to the two-wire and the four-wire send/receive lines respectively, (b) remote signal translating means coupled between said two-wire terminal pair and the receive line terminal pair for extracting the remote signal and impressing it on the receive line, said translating means including a solid-state device having input, output, and common electrodes with said two-wire terminal pair coupled to said input electrode, (c) local signal translating means coupled to the send line terminal pair to impress a local signal on said two-wire terminal pair for transmission over said two-wire line and simultaneously to the input electrode of said remote signal translating means, said local signal translating means including further means to couple the local signal to the common electrode of said remote signal translating means in the same phase as that coupled to the input electrode so that the local signal is applied simultaneously both to the input and output electrodes of said remote translating means as two, equal, in-phase signal components whereby the potential on said electrodes varies by the same amount and in the same direction and no translation of said local signal takes place therein, thereby isolating the receive and send terminals and their associated lines.

2. The hybrid according to claim 1 wherein said remote signal translating means includes a transistor amplifier stage, said local signals being applied to the input and output electrodes as substantially equal, in-phase signals so that the potential variation across the forward-biased junction of the transistor due to the local signal is substantially zero and no translation of the local signal takes place while the remote signal is amplified and impressed on the receive line.

3. The hybrid according to claim 1 wherein said local signal translating means includes a pair of transistors connected in the emitter-follower configuration having their inputs coupled to the send line terminal pair and the output of one of said followers coupled to the two-wire terminal pair and thus to the input electrode of the remote signal translating means and the output electrode of the other of said followers coupled to the output electrode of said remote signal translating device.

4. The hybrid according to claim 1 wheerin the local signal translating means includes individual signal translating sections for producing two out-of-phase local signal components for use with a balanced two-wire line.

5. The hybrid according to claim 4 wherein said local signal translating means further includes a phase-splitter coupled between the send line terminal pair and said translating sections to apply out-of-phase local signal components to the said translating sections.

6. The hybrid according to claim 2 wherein said local signal translating means includes a pair of transistors connected in the emitter-follower configuration, each having their inputs coupled to the send line terminal pair and their outputs connected respectively to the input and output electrodes of the transistor-amplifier to impress substantially equal, in-phase local signal components to both of these electrodes whereby the potential variation across the forward-biased transistor-amplifier junction due to the local signal is essentially zero, thereby isolating the send and receive terminal pairs of the hybrid.

7. The hybrid according to claim 1 wherein the remote signal translating means includes a common emitter transistor-amplifier with the two-wire line terminal pair coupled to the base and emitter electrodes and the receive terminal pair to the collector and emitter electrodes, with said further means in said local signal translating means being coupled to the emitter of said amplifier whereby substantially equal, in-phase local signals are simultaneously impressed on the base and emitter electrodes of the common emitter amplifier.

References Cited

UNITED STATES PATENTS 3,180,947 4/1965 Haselton et al.
3,387,096 6/1968 Grandstaff et al.

KATHLEEN H. CLAFFY, *Primary Examiner.*

W. A. HELVESTINE, *Assistant Examiner.*

U.S. Cl. X.R.

179—170